(12) United States Patent
Kramar et al.

(10) Patent No.: US 10,029,544 B2
(45) Date of Patent: Jul. 24, 2018

(54) GLASS RUN CHANNEL AND APPLIQUE ATTACHMENT AND METHOD

(71) Applicants: GM GLOBAL TECHNOLOGY OPERATIONS LLC, Detroit, MI (US); Henniges Automotive Sealing Systems North America, Inc., Dover, DE (US)

(72) Inventors: Keith A. Kramar, Lake Orion, MI (US); Kevin Parent, Rochester Hills, MI (US); Dale French, Clinton Township, MI (US); Todd Russell, South Lyon, MI (US); Shayne Bigelow, Pontiac, MI (US)

(73) Assignees: GM Global Technology Operations LLC, Detroit, MI (US); Henniges Automotive Seeding Systems North America, Inc, Dover, DE (US)

( * ) Notice: Subject to any disclaimer, the term of this patent is extended or adjusted under 35 U.S.C. 154(b) by 119 days.

(21) Appl. No.: 15/196,759

(22) Filed: Jun. 29, 2016

(65) Prior Publication Data

US 2018/0001748 A1    Jan. 4, 2018

(51) Int. Cl.
*B60J 5/04*        (2006.01)
*E06B 3/42*        (2006.01)
*E06B 7/16*        (2006.01)

(52) U.S. Cl.
CPC ............. *B60J 5/0402* (2013.01); *E06B 3/42* (2013.01); *E06B 7/16* (2013.01)

(58) Field of Classification Search
CPC ............. E06B 3/42; E06B 7/16; B60J 5/0402

USPC ................. 296/1.08, 93, 146.2, 146.5, 146.9
See application file for complete search history.

(56) References Cited

U.S. PATENT DOCUMENTS

| | | | |
|---|---|---|---|
| 5,092,078 A | 3/1992 | Keys | |
| 5,451,090 A | 9/1995 | Brodie et al. | |
| 7,114,221 B2 | 10/2006 | Gibbons et al. | |
| 7,425,032 B2 * | 9/2008 | Morikawa | B60J 10/78 296/146.1 |
| 7,837,257 B2 | 11/2010 | Kuntze et al. | |
| 8,640,385 B2 | 2/2014 | Sawatani et al. | |
| 9,022,446 B2 * | 5/2015 | Zimmer | B60J 5/0402 296/1.08 |

(Continued)

FOREIGN PATENT DOCUMENTS

DE    19543819 A1    8/1996
JP    06156157 A    6/1994

*Primary Examiner* — Pinel E Romain
(74) *Attorney, Agent, or Firm* — Quinn IP Law

(57) ABSTRACT

A glass run channel and applique attachment for a door having a door frame and an openable window includes a glass run channel, an applique, and a fastener. The glass run channel has a first locating feature adapted for attachment to the door frame and a first snap-fit feature. The applique has a second locating feature and a second snap-fit feature. The applique is located relative to the glass run channel in a located position when the first locating feature contacts the second locating feature and is attached to the glass run channel in the located position when the first snap-fit feature engages the second snap-fit feature. The fastener mounts the first locating feature to the door frame and is concealed from view on the interior surface of the door by the door frame and on the exterior surface of the door by the applique.

18 Claims, 4 Drawing Sheets

(56) References Cited

U.S. PATENT DOCUMENTS

| | | | |
|---|---|---|---|
| 9,114,765 B1 * | 8/2015 | James | B60R 13/04 |
| 9,234,540 B2 | 1/2016 | Bachelder et al. | |
| 9,783,134 B2 * | 10/2017 | Mori | B60R 13/04 |
| 2015/0165880 A1 | 6/2015 | Mass et al. | |

* cited by examiner

GLASS RUN CHANNEL AND APPLIQUE ATTACHMENT AND METHOD

TECHNICAL FIELD

This disclosure relates to a glass run channel and applique attachment and method.

BACKGROUND

A vehicle typically includes at least one door having an openable window and a door frame. The door may include a glass run channel attached to the door frame and configured to guide the opening and closing of the window. The door may also include an applique attached to the exterior of the door frame with a fastener. The door may be configured as a frame under glass door, as known to those skilled in the art, in which the openable window is located outboard of the door frame when the openable window is in a closed position.

SUMMARY

A glass run channel and applique attachment, a vehicle, and a method are provided herein. The glass run channel and applique attachment is for a door having an interior surface, an exterior surface, a door frame, and an openable window. The glass run channel and applique attachment includes a glass run channel, an applique, and a fastener. The glass run channel is configured to guide movement of the openable window and has a first locating feature adapted for attachment to the door frame and a first snap-fit feature. The applique has a second locating feature and a second snap-fit feature. The applique is located relative to the glass run channel in a located position when the first locating feature contacts the second locating feature. The applique is attached to the glass run channel in the located position when the first snap-fit feature engages the second snap-fit feature. The fastener mounts the first locating feature to the door frame. The fastener is concealed from view on the interior surface of the door by the door frame. The fastener is concealed from view on the exterior surface of the door by the applique when the applique is in the located position.

The vehicle includes a body and a door operatively connected to the body. The door includes an interior surface, an exterior surface; a door frame, an openable window, a glass run channel, an applique, and a fastener. The glass run channel is configured to guide movement of the openable window and has a first locating feature attached to the door frame and a first snap-fit feature. The applique has a second locating feature and a second snap-fit feature. The applique is located relative to the glass run channel in a located position when the first locating feature contacts the second locating feature. The applique is attached to the glass run channel in the located position when the first snap-fit feature engages the second snap-fit feature. The fastener mounts the first locating feature to the door frame. The fastener is concealed from view on the interior surface of the door by the door frame. The fastener is concealed from view on the exterior surface of the door by the applique.

A method for attaching a glass run channel and an applique to a door frame of a door with no visible fastener is provided. The method includes the steps of: attaching a locating block of the glass run channel to the door frame by a fastener while concealing the fastener from view on an interior surface of the door with the door frame; locating the applique relative to the glass run channel in a located position by contacting a first locating feature of the locating block to a second locating feature of a locating rib of the applique; and attaching the applique to the glass run channel in the located position by engaging a first snap-fit feature of the locating block to a second snap-fit feature of the locating rib while concealing the fastener from view on an exterior surface of the door with the applique.

The glass run channel and applique attachment, the vehicle, and the method disclosed herein provide attachment of the glass run channel and the applique to a door with no visible fastener. This disclosure applies to any machine or manufacture, either stationary or mobile, having a door with an openable window. This disclosure applies to any vehicle, including but not limited to cars, trucks, vans, all-terrain vehicles, busses, boats, trains, airplanes, manufacturing vehicles and equipment, construction vehicles and equipment, maintenance vehicles and equipment, etc.

The above features and advantages and other features and advantages of the present teachings are readily apparent from the following detailed description of the best modes for carrying out the present teachings when taken in connection with the accompanying drawings.

DETAILED DESCRIPTION

Those having ordinary skill in the art will recognize that terms such as "above," "below," "upward," "downward,"

"top," "bottom," etc., are used descriptively for the figures, and do not represent limitations on the scope of the disclosure, as defined by the appended claims.

Figure 1:
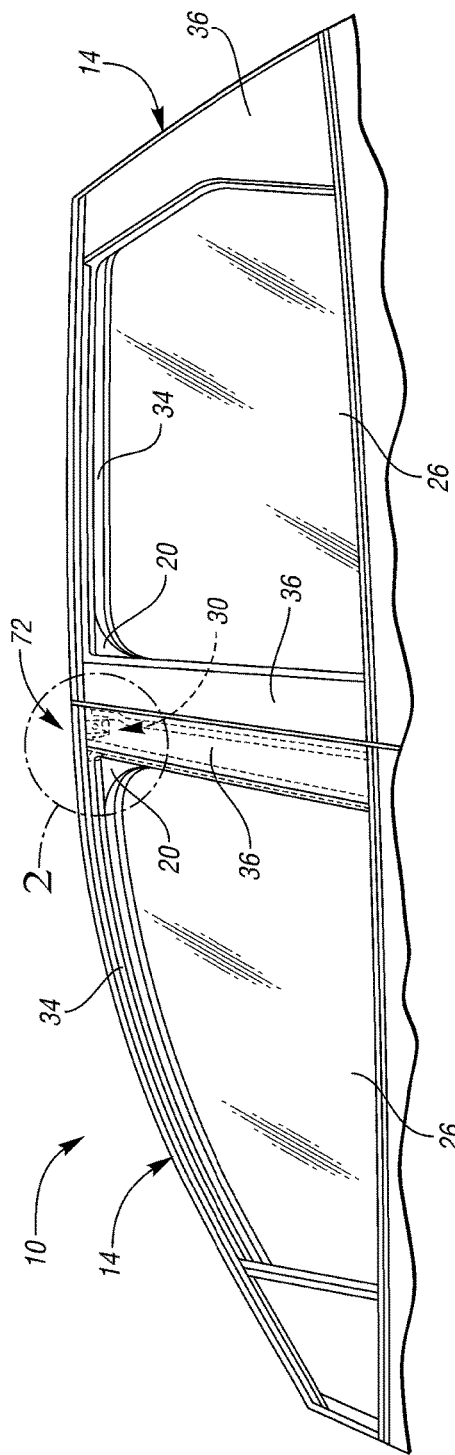
FIG. 1 is a fragmentary, schematic, perspective illustration of a frame under glass front and rear door of a vehicle, with the doors having an openable window, a glass run channel, an applique, and an example glass run channel and applique attachment of this disclosure.

Referring to the drawings, wherein like reference numbers refer to like components throughout the views, FIG. 1 shows a portion of an example vehicle 10. The vehicle 10 includes a glass run channel and applique attachment 30 as disclosed herein. While the vehicle 10 of FIG. 1 is a typical example application suitable for the glass run channel and applique attachment 30, the present design is not limited to vehicular applications. Any stationary or mobile, machine or manufacture may benefit from use of the present design, when properly scaled and configured for the particular application. For illustrative consistency, the vehicle 10 will be described hereinafter as an example system without limiting use of the glass run channel and applique attachment 30 to such an embodiment.

Referring now to FIGS. 1-5, the vehicle 10 includes a structure or body (not shown) and a door 14. The door 14 may be a side door, as shown, a rear door, or any other door. The door 14 is operatively connected to the body of the vehicle 10 such that the door 14 may be in a closed position, as shown, or in an open position (not shown). For example, the door 14 may be operatively connected to the body via hinges (not shown) and an openable door latch (not shown). The door 14 may be moved between the closed position and the open position by an operator (not shown) of the vehicle 10. The door 14 includes an inboard or interior surface 16 and an outboard or exterior surface 18. Inboard is defined herein as closer to a geometric center of the vehicle 10. Outboard is defined herein as farther from the geometric center of the vehicle 10. The interior surface 16 of the door 14 is partially visible when the door 14 is in the closed position and fully visible when the door 14 is in the open position. The exterior surface 18 of the door 14 is fully visible when the door 14 is in both the open position and the closed position.

The door 14 includes a door frame 20. The door frame 20 may include an inner portion 22 and an outer portion 24. The inner portion 22 of the door frame 20 may be located inboard of the outer portion 24 of the door frame 20. The inner portion 22 of the door frame 20 may be attached to the outer portion 24 of the door frame 20 via a weld, a mechanical fastener, an adhesive, or any other suitable attachment. The door 14 also includes an openable window 26. The openable window 26 is openable and closable by the operator of the vehicle 10. The openable window 26 may be located outboard of the door frame 20 when the openable window 26 is in a closed position, as shown, in a frame under glass configuration, as understood by those skilled in the art.

Continuing to refer to FIGS. 1-5, the door 14 includes the glass run channel and applique attachment 30. The glass run channel and applique attachment 30 includes a fastener 32, a glass run channel 34, and an applique 36. The glass run channel 34 is configured to guide the movement of the openable window 26 as it is moved between the closed position and the open position. The glass run channel 34 may also be configured to provide a seal between the openable window 26 and the door frame 20. The glass run channel 34 may include a molded portion 38 and an extruded portion 40. The glass run channel 34 may be made of a plastic material, a rubber material, or any other suitable material.

The glass run channel 34 includes a first locating feature 42 and a first snap-fit feature 44. The applique 36 includes a second locating feature 46 and a second snap-fit feature 48. A locating feature is defined herein as a feature that facilitates location of a first part in a predetermined position relative to a second part. A snap-fit feature is defined herein as a feature that enables the attachment of parts by moving and pressing the parts together in a single direction. The parts may be moved and pressed together in a single direction by one of an operator and a machine.

Figure 3:
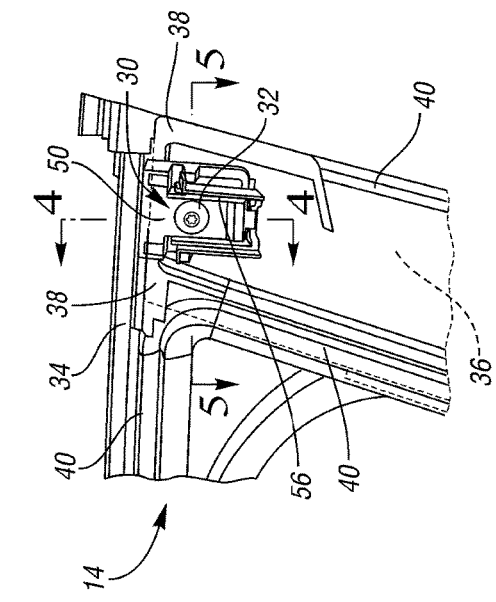
FIG. 3 is a schematic, perspective illustration of the area in circle 2 of FIG. 1, with an outer portion of the applique shown in phantom.
Figure 2:
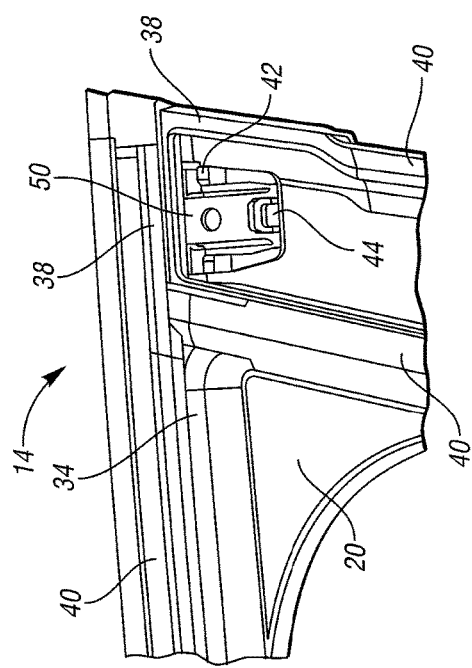
FIG. 2 is a schematic, perspective illustration of the area in circle 2 of FIG. 1, with the applique, the openable window, and a fastener removed.
Figure 4:
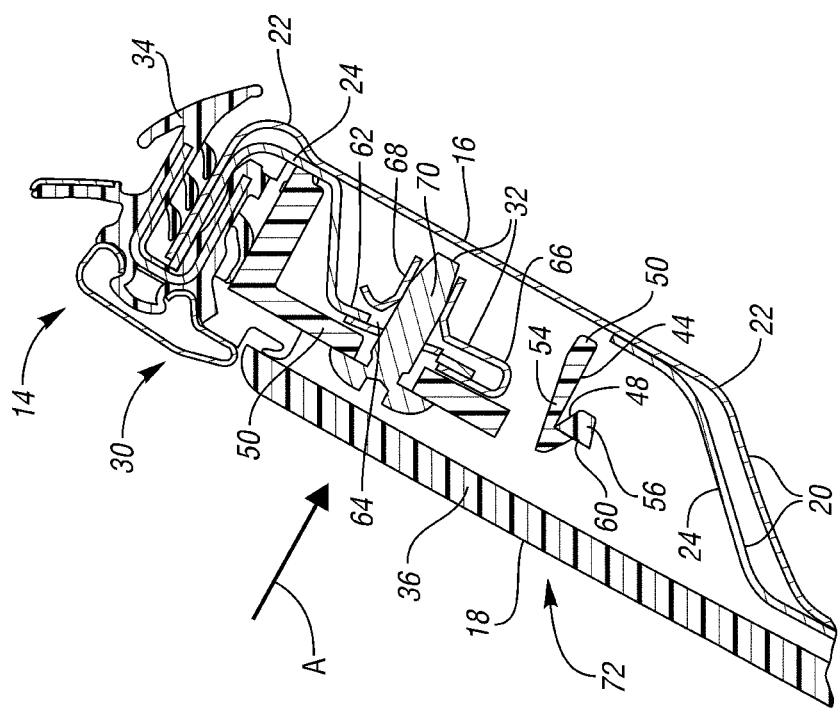
FIG. 4 is a schematic, cross-sectional illustration of the glass run channel and applique attachment of FIG. 1, taken at line 4-4 of FIG. 3.
Figure 6C:
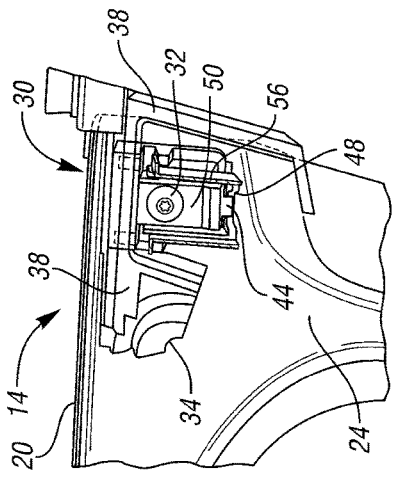
FIG. 6C is a schematic, cross-sectional illustration, partially in elevation, of the door of FIG. 1, taken through a locating rib of the applique, showing the glass run channel and applique attachment.
Figure 6B:
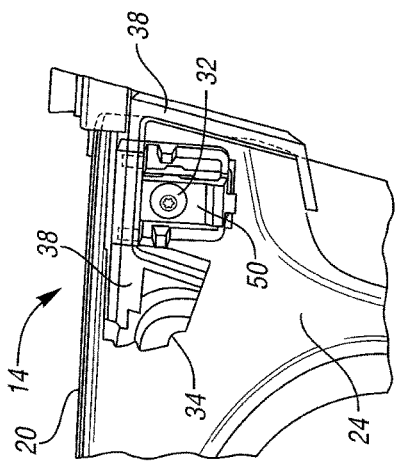
FIG. 6B is a fragmentary, schematic, perspective illustration of the door of FIG. 1, with a molded portion of the glass run channel attached via a fastener.
Figure 6A:
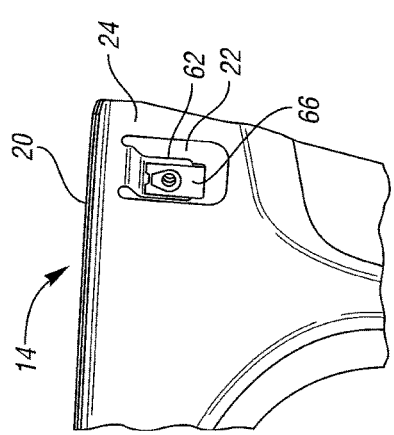
FIG. 6A is a fragmentary, schematic, perspective illustration of the door of FIG. 1, before attaching the glass run channel and the applique.
Figure 7B:
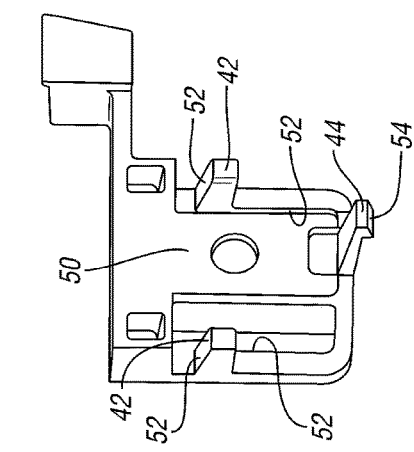
FIG. 7B is a schematic, perspective illustration of an inboard facing side of the applique of FIG. 1, showing the locating rib of the applique.
Figure 7A:
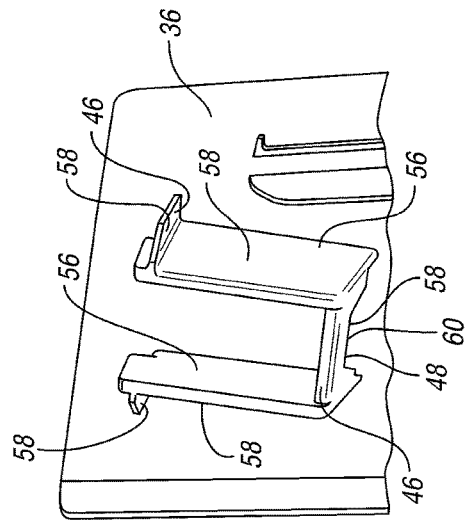
FIG. 7A is a schematic, perspective illustration of an outboard facing side of a locating block of the glass run channel of FIG. 1, before the locating block is co-molded in the molded portion of the glass run channel.

Referring now to FIGS. 2-5 and 7A, the glass run channel 34 may include a locating block 50 having one or more locating surfaces 52. The first locating feature 42 may be the locating block 50 of the glass run channel 34. The first locating feature 42 may be the one or more locating surfaces 52 of the locating block 50. The locating block 50 may further include the first snap-fit feature 44. The first snap-fit feature 44 may be a clip 54, as best seen in FIG. 4. The glass run channel 30 may be made of a first material and the locating block 50 may be made of a second material. The locating block 50 may be co-molded in the glass run channel 34 as a single, unitary piece. The glass run channel 34 may be a single, unitary piece that includes the locating block 50, the molded portion 38, and the extruded portion 40, as shown. Co-molded is defined herein as molding around a part that is inserted in the mold prior to the molding operation so that the part is fused into the molding as a single, unitary piece. The locating block 50 may or may not be a separate part, attached to the glass run channel 34 via adhesive bonding, welding, mechanical fastening, or any other attachment method.

Referring now to FIGS. 3-5 and 7B, the applique 36 may include a locating rib 56 having one or more locating surfaces 58. The second locating feature 46 may be the locating rib 56. The second locating feature 46 may be the one or more locating surfaces 58 of the locating rib 56. The locating rib 56 may include a snap-fit surface 60. The second snap-fit feature 48 may be the snap-fit surface 60 of the locating rib 56. The applique 36 and the locating rib 56 may be a single, unitary price, as shown. The locating rib 56 may or may not be a separate part, attached to the applique 36 via adhesive bonding, welding, mechanical fastening, or any other attachment method.

Referring now to FIGS. 3-7B, the first locating feature 42 of the glass run channel 34 is attached or mounted to the door frame 20 via the fastener 32. The first locating feature 42 of the glass run channel 34 may be attached to the door frame 20 via the fastener 32 with no opening in and no penetration of the interior surface 16 of the door 14. The first locating feature 42 of the glass run channel 34 may be attached to the door frame 20 via the fastener 32 with no opening in and no penetration of the inner portion 22 of the door frame 20. The fastener 32 may be a mechanical fastener. The fastener 32 may be a threaded mechanical fastener, as shown. The first locating feature 42 of the glass run channel 34 may be attached to the inner portion 22 of the door frame 20 via the fastener 32.

The door frame 20 may include a locating tab 62. The inner portion 22 of the door frame 20 may include the locating tab 62. The inner portion 22 of the door frame 20 and the locating tab 62 may be a single, unitary piece, as shown. The locating tab 62 may form an opening or hole 64. The fastener 32 may include a J-nut 66 having a threaded or unthreaded nut portion 68 and a threaded bolt or screw 70 configured to engage the nut portion 68 of the J-nut 66. The J-nut 66 may be configured to clip onto the locating tab 62 to position the nut portion 68 of the J-nut 66 behind and aligned with the opening or hole 64 of the locating tab 62. Alternatively, the fastener 32 may be a threaded screw (not shown) that engages the inner portion 22 of the door frame 20. The locating block 50 of the glass run channel 34 may be attached to the locating tab 62 of the door frame 20 via the fastener 32. The fastener 32 may or may not be an adhesive bond or a weld. The locating tab 62 may or may not be welded, fused, or adhesively bonded to the door frame 20. The fastener 32 may or may not be welded, fused, or adhesively bonded to the door frame 20. The fastener 32 may or may not be welded, fused, or adhesively bonded to the locating tab 62 of the door frame 20.

Continuing to refer to FIGS. 3-7B, the applique 36 is locatable relative to the glass run channel 34 in a located position 72 via contact of the first locating feature 42 with the second locating feature 46 when the first locating feature 42 is attached to the door frame 20. The locating surfaces 52 of the locating block 50 and the locating surfaces 58 of the locating rib 56 may be configured to locate the applique 36 relative to the glass run channel 34 in all six degrees of freedom, i.e., the applique 36 may be located relative to the glass run channel 34 in a fixed position along orthogonal x, y, and z axes and in a fixed rotation about the orthogonal x, y, and z axes.

The applique 36 is attached to the glass run channel 34 in the located position 72 via engagement of the first snap-fit feature 44 with the second snap-fit feature 48 when the first locating feature 42 is attached to the door frame 20. The first snap-fit feature 44 and the second snap-fit feature 48 may be configured to engage one another by moving and pressing the applique 36 toward the glass run channel 34 in a single, outboard to inboard snap-fit attachment direction (arrow A).

Figure 5:
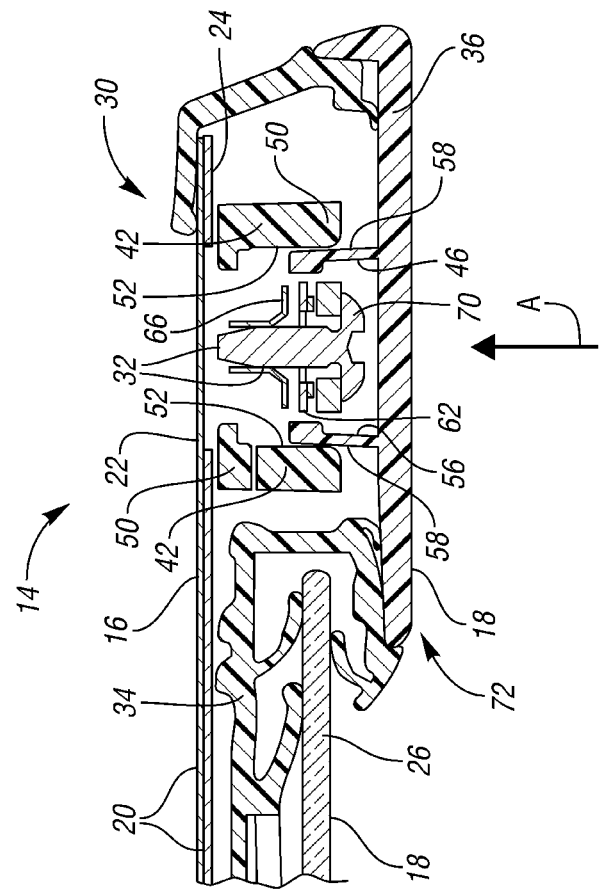
FIG. 5 is a schematic, cross-sectional illustration of the glass run channel and applique attachment of FIG. 1, taken at line 5-5 of FIG. 3.

Referring now to FIGS. 3-5, the fastener 32 is concealed from view on the interior surface 16 of the door 14 by the inner portion 22 of the door frame 20 when the first locating feature 42 is attached to the door frame 20. The fastener 32 is concealed from view on the exterior surface 18 of the door 14 by the applique 36 when the applique 36 is in the located position 72.

Figure 8:
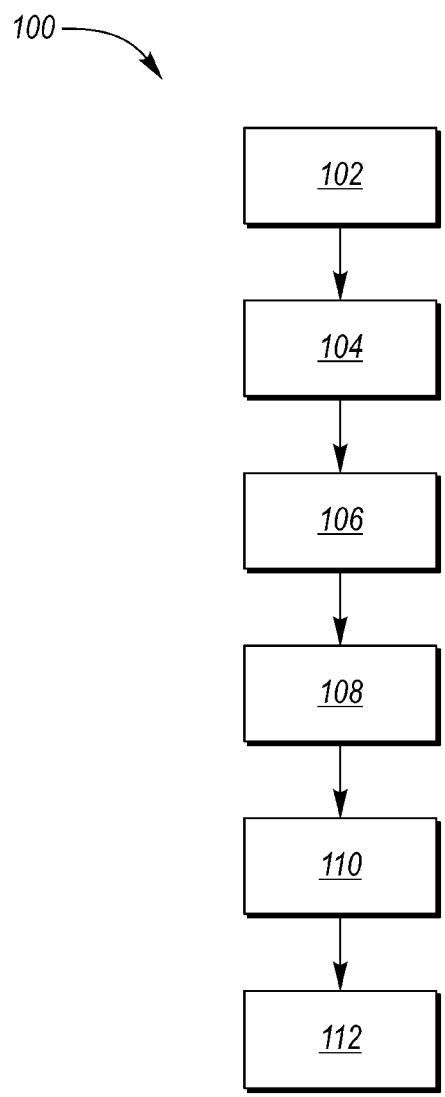
FIG. 8 is a flow chart of an example method for attaching the glass run channel and an applique to the door with no visible fastener.

Referring now to FIG. 8, an example method 100 for attaching the glass run channel 34 and the applique 36 to the door frame 20 of the door 14, described above, with no visible fastener, commences at step 102. At step 102, the locating tab 62 may be formed on the outer portion 24 of the door frame 20. This may be done as part of a stamping or forming process. At step 104, the locating block 50 may be co-molded in the glass run channel 34. This may create a single, unitary glass run channel 34 that includes the locating block 50, the molded portion 38, and the extruded portion 40. At step 106, the locating rib 56 may be molded in the applique 36. This may create a single, unitary applique 36 that includes the locating rib 56.

At step 108, the locating block 50 of the glass run channel 34 is attached to the door frame 20 by the fastener 32 while concealing the fastener 32 from view on the interior surface 16 of the door 14 with the inner portion 22 of the door frame 20. Step 108 may include attaching the locating block 50 of the glass run channel 34 to the locating tab 62 of the inner portion 22 of the door frame 20 via the fastener 32.

At step 110, the applique 36 is located relative to the glass run channel 34 in the located position 72 by contacting the first locating feature 42 of the locating block 50 of the glass run channel 34 to the second locating feature 46 of the locating rib 56 of the applique 36.

At step 112, the applique 36 is attached to the glass run channel 34 in the located position 72 by engaging a first snap-fit feature 44 of the locating block 50 to a second snap-fit feature 48 of the locating rib 56 while concealing the fastener 32 from view on the exterior surface 18 of the door 14 with the applique 36.

While the best modes for carrying out the many aspects of the present teachings have been described in detail, those familiar with the art to which these teachings relate will recognize various alternative aspects for practicing the present teachings that are within the scope of the appended claims.

The invention claimed is:

1. A glass run channel and applique attachment for a door having an interior surface, an exterior surface, a door frame, and an openable window, the glass run channel and applique attachment comprising:
   a glass run channel configured to guide movement of the openable window and to provide a seal between the openable window and the door frame, the glass run channel having a locating block adapted for attachment to the door frame, the locating block including a first locating feature and a first snap-fit feature;
   an applique having a second locating feature and a second snap-fit feature with the applique located relative to the glass run channel in a located position when the first locating feature contacts the second locating feature, and the applique attached to the glass run channel in the located position when the first snap-fit feature engages the second snap-fit feature; and
   a fastener for mounting the locating block to the door frame with the fastener being concealed from view on the interior surface of the door by the door frame, and the fastener being concealed from view on the exterior surface of the door by the applique when the applique is in the located position.

2. The glass run channel and applique attachment of claim 1, wherein the locating block includes a locating surface with the first locating feature being further defined as the locating surface of the locating block.

3. The glass run channel and applique attachment of claim 2, wherein the glass run channel is made of a first material and the locating block is made of a second material different from the first material.

4. The glass run channel and applique attachment of claim 2, wherein the locating block is co-molded in the glass run channel.

5. The glass run channel and applique attachment of claim 1, wherein the first snap-fit feature is a clip.

6. The glass run channel and applique attachment of claim 1, wherein the applique includes a locating rib having a locating surface with the second locating feature being further defined as the locating surface of the locating rib.

7. The glass run channel and applique attachment of claim 6, wherein the locating rib includes a snap-fit surface with the second snap-fit feature being further defined as the snap-fit surface of the locating rib.

8. The glass run channel and applique attachment of claim 7, wherein the locating block includes a locating surface and a clip with the locating surface of the locating rib engaging the locating surface of the locating block, and the snap-fit surface of the locating rib engaging the clip of the locating block when the applique is located and attached to the glass run channel.

9. The glass run channel and applique attachment of claim 1, wherein the fastener includes a J-clip having a nut portion and a bolt configured to engage the nut portion.

10. A vehicle, comprising:
   a body; and
   a door operatively connected to the body, including:
      an interior surface;
      an exterior surface;
      a door frame;
      an openable window;

a glass run channel configured to guide movement of the openable window and to provide a seal between the openable window and the door frame, the glass run channel having a locating block attached to the door frame, the locating block including a first locating feature and a first snap-fit feature; and an applique having a second locating feature and a second snap-fit feature with the applique located relative to the glass run channel in a located position when the first locating feature contacts the second locating feature, and the applique attached to the glass run channel in the located position when the first snap-fit feature engages the second snap-fit feature; and a fastener mounting the locating block to the door frame with the fastener being concealed from view on the interior surface of the door by the door frame and the fastener being concealed from view on the exterior surface of the door by the applique.

11. The vehicle of claim 10, wherein the openable window is located outboard of the door frame when the openable window is in a closed position.

12. The vehicle of claim 11, wherein the locating block includes a locating surface with the first locating feature being further defined as the locating surface of the locating block, and the glass run channel being made of a first material, and the locating block being made of a second material different from the first material.

13. The vehicle of claim 10, wherein the applique includes a locating rib having a locating surface with the second locating feature being further defined as the locating surface of the locating rib.

14. The vehicle of claim 13, wherein the locating rib of the applique further includes a snap-fit surface, and the first snap-fit feature is a clip with the second snap-fit feature being further defined as the snap-fit surface of the locating rib.

15. The vehicle of claim 10, wherein the door frame includes a locating tab with the locating block attached to the locating tab of the door frame by the fastener.

16. A method for attaching a glass run channel and an applique to a door frame of a door with no visible fastener, comprising the steps of:

attaching a locating block of the glass run channel to the door frame by a fastener while concealing the fastener from view on an interior surface of the door with the door frame;

locating the applique relative to the glass run channel in a located position by contacting a first locating feature of the locating block to a second locating feature of a locating rib of the applique;

attaching the applique to the glass run channel in the located position by engaging a first snap-fit feature of the locating block to a second snap-fit feature of the locating rib while concealing the fastener from view on an exterior surface of the door with the applique.

17. The method of claim 16, further comprising the step of forming a locating tab on the door frame; and wherein the step of attaching the locating block of the glass run channel to the door frame by the fastener is further defined as attaching the locating block of the glass run channel to the locating tab of the door frame by the fastener.

18. The method of claim 16, further comprising the steps of:

co-molding the locating block in the glass run channel; and molding the locating rib in the applique.

* * * * *

UNITED STATES PATENT AND TRADEMARK OFFICE
CERTIFICATE OF CORRECTION

PATENT NO. : 10,029,544 B2
APPLICATION NO. : 15/196759
DATED : July 24, 2018
INVENTOR(S) : Keith A. Kramer et al.

It is certified that error appears in the above-identified patent and that said Letters Patent is hereby corrected as shown below:

On the Title Page

IN THE ASSIGNEES:
Item (73): Please delete "Henniges Automotive Seeding Systems North America, Inc" and insert:
-- Henniges Automotive Sealing Systems North America, Inc. --.

Signed and Sealed this
Twenty-eighth Day of August, 2018

Andrei Iancu
*Director of the United States Patent and Trademark Office*